(12) United States Patent
Silva Guisado

(10) Patent No.: US 10,303,651 B2
(45) Date of Patent: May 28, 2019

(54) LOAD BACK OF ARCHIVED DATA

(71) Applicant: SAP SE, Walldorf (DE)

(72) Inventor: Victor Silva Guisado, Heidelberg (DE)

(73) Assignee: SAP SE, Walldorf (DE)

( * ) Notice: Subject to any disclaimer, the term of this patent is extended or adjusted under 35 U.S.C. 154(b) by 630 days.

(21) Appl. No.: 15/053,077

(22) Filed: Feb. 25, 2016

(65) Prior Publication Data
US 2017/0249321 A1 Aug. 31, 2017

(51) Int. Cl.
| | | |
|---|---|---|
| G06F 17/30 | (2006.01) | |
| G06F 16/11 | (2019.01) | |
| G06F 16/22 | (2019.01) | |
| G06F 16/23 | (2019.01) | |
| G06F 8/30 | (2018.01) | |

(52) U.S. Cl.
CPC ............ *G06F 16/113* (2019.01); *G06F 8/315* (2013.01); *G06F 16/2282* (2019.01); *G06F 16/2379* (2019.01)

(58) Field of Classification Search
CPC ................................................ G06F 17/30073
See application file for complete search history.

(56) References Cited

U.S. PATENT DOCUMENTS

2014/0279976 A1* 9/2014 Davidson .......... G06F 17/30309
707/695

* cited by examiner

*Primary Examiner* — Syed H Hasan
(74) *Attorney, Agent, or Firm* — Buckley, Maschoff & Talwalkar LLC

(57) ABSTRACT

A system includes reception of an instruction to load data associated with an archiving object and an archiving session into a database system, determination of an archive file associated with the archiving object and the archiving session, determination of one or more database tables of the database system and fields of the one or more database tables associated with the archive file, automatic generation of processor-executable code of a subroutine pool based on the fields of the one or more database tables, and execution of the processor-executable code of the subroutine pool to read one or more data objects of the archive file, populate one or more internal tables based on records of the one or more data objects, and insert the one or more internal tables into corresponding ones of the one or more database tables of the database system.

20 Claims, 8 Drawing Sheets

Archiving Objects

| Arch. Obj. | Description of the Archiving Object |
|---|---|
| /BEV2/EDMD | Excise Duty: Archiving the document table |
| /BEV4/PL01 | Request Data |
| /BEV4/PL02 | Converted Request Table with Reporting Period |
| /BEV4/PL03 | Request Table with Reporting Period |
| /BEV4/PL04 | Logs for Pendulum List Sales |
| /BOFU/BOTC | Example of Archiving BOPF BO |
| /DSD/DEX | DSD: Archiving Object for DEX Streams |
| /DSD/SL | DSD: Archiving Object for Settlement Documents |
| /DSD/VC | DSD: Archiving Object for Visit List |
| /POSDW/AGG | Archiving POS Aggregates |
| /POSDW/TL | Archiving POS Transaction Data |
| /SAPBOQ/01 | Composite for Service Master Record |
| /SAPCEM/01 | CEM Shipping Document |
| /SAPCEM/02 | CEM PBE Document |
| /SAPCEM/03 | CEM BOM |
| /SAPCEM/04 | CEM Catalog |
| /SAPCEM/05 | CEM Insurance |
| /SAPCEM/06 | CEM Condition Records |
| /SAPCEM/07 | CEM Requisition Note |

| Archive Administration: Select Files for Load-back | |
|---|---|
| Archiving Object     BC_DBLOGS | |
| Sessions and Files for Archiving Object | Note |
| ▼ Complete Archiving Sessions<br>  ▼ 1845 (08.11.2011)<br>    • 1845 – 08.11.2011 | <br><br>01.01.2010, 00:00:00 – 30.06.2010, 23:59:59 |

Tables Archived

Tables in Object    BC_DBLOGS

| Table | Description |
|---|---|
| DBTABLOG | Log Records of Table Changes |

Tables Archived

Archiving Object    BC_DBLOGS
Description         Archiving Changes to Customizing Tables

| Parent Segment | Segment | Structure |
|---|---|---|
|  | DBTABLOG |  |
| DBTABLOG | SDBTLGKEYX |  |

*FIG. 6*

View Fields

Maint. View      V_ARC_DEF
Description      Structure of an Archiving Object

| View Field | Table | Field | Data Elem. | DType | Short Description |
|---|---|---|---|---|---|
| OBJECT | ARCH_DEF | OBJECT | OBJCT_TR01 | CHAR | Archiving Object |
| SEQUENCE | ARCH_DEF | SEQUENCE | RKZ_RECNR | NUMC | Number of the Record in Hierarchy |
| FATHER | ARCH_DEF | FATHER | ARCH_FATHE | CHAR | Parent segment in Hierarchy |
| SON | ARCH_DEF | SON | ARCH_SON | CHAR | Segment in Hierarchy |
| STRUCTURE | ARCH_DEF | STRUCTURE | ARCH_STRU_ | CHAR | Structure of Segment in Hierarchy |
| DELETE_FLG | ARCH_DEF | DELETE_FLG | DELETE_FLG | CHAR | Data NOT to be Deleted |
| OBJTEXT | ARCH_TXT | OBJTEXT | OBTXT_TR01 | CHAR | Description of the Archiving Object |

*FIG. 7*

| object | record type | content |
|---|---|---|
| 1 | invoice_table | invoice_header_1 |
| 1 | invoice_content_table | line_item 1 |
| 1 | item_price_table | price_line_item_1 |
| 1 | invoice_content_table | line_item 2 |
| 1 | item_price_table | price_line_item_2 |
| 2 | invoice_table | invoice_header_2 |
| 2 | invoice_content_table | line_item 3 |
| 2 | item_price_table | price_line_item_3 |
| 3 | invoice_table | invoice_header_3 |
| 3 | invoice_content_table | line_item 4 |
| 3 | item_price_table | price_line_item_4 |
| 3 | invoice_content_table | line_item 5 |
| 3 | item_price_table | price_line_item_5 |
| 3 | invoice_content_table | line_item 6 |
| 3 | item_price_table | price_line_item_6 |
| 3 | invoice_content_table | line_item 7 |
| 3 | item_price_table | price_line_item_7 |
| 3 | discount_table | Discount_rate |

FIG. 8

LOAD BACK OF ARCHIVED DATA

BACKGROUND

Modern database systems store ever-increasing amounts of data. This data is typically stored as records of database tables within a database-optimized data store. This storage facilitates access, reporting, modification, and backup of the data using known database techniques.

Due to performance and/or storage capacity concerns, it may be desired to occasionally delete data from a database system. This deleted data is preferably archived so as to be accessible at a later date if needed. Archived data is stored in archive files, which are typically non-indexed information structures. These structures are not formatted in a manner which allows a database system to directly access the data stored therein. Rather, the data stored in an archive file must be reloaded into a database system (e.g., in the form of database tables) in order for the database system to use the data.

Conventional techniques for reloading archived data are problematic. For example, each archive file is generated based on an associated "archiving object". An archiving object describes table structures, the context of the data to be archived, and various archiving preferences. A developer creates a "load back" report to control the reloading of an archive file's data based on the archive file's associated archiving object. However, because archiving objects may be freely customized and configured, a new load back report must be manually created for each different archiving object whose associated archive files are to be reloaded. This effort consumes significant resources and is prone to errors.

BRIEF DESCRIPTION OF THE DRAWINGS

FIG. 3 is an outward view of a user interface for selecting an archiving object according to some embodiments.

FIG. 4 is an outward view of a user interface for selecting an archiving session according to some embodiments.

FIG. 5-7 are outward views of user interfaces for determining database tables associated with an archiving object according to some embodiments.

FIG. 8 is a tabular representation of a portion of an archive file according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
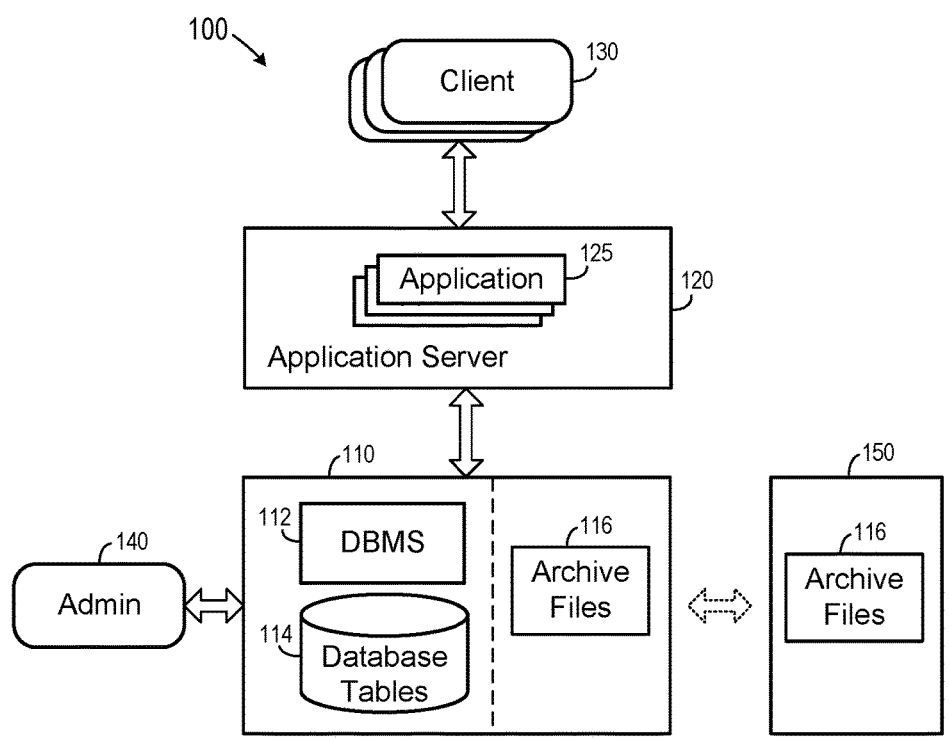
FIG. 1 is a block diagram of a system according to some embodiments.

FIG. 1 is a block diagram of architecture 100 according to some embodiments. Embodiments are not limited to architecture 100 or to a database architecture.

Architecture 100 includes database 110, application server 120, clients 130, administration device 140 and offline storage 150. During typical operation, applications 125 executing within application server 120 receive queries from clients 130 and provide results to clients 130 based on data of database 110.

Application server 120 executes and provides services to applications 125. Applications 125 may comprise server-side executable program code (e.g., compiled code, scripts, etc.) which provide functionality to clients 130 by providing user interfaces to clients 130, receiving requests from clients 130, retrieving data from database 110 based on the requests, processing the data received from database 110, and providing the processed data to clients 130. Applications 125 may be made available for execution by application server 120 via registration and/or other procedures which are known in the art.

Application server 120 provides any suitable interfaces through which clients 130 may communicate with applications 125 executing on application server 120. For example, application server 120 may include a HyperText Transfer Protocol (HTTP) interface supporting a transient request/response protocol over Transmission Control Protocol (TCP), a WebSocket interface supporting non-transient full-duplex communications between application server 120 and any clients 130 which implement the WebSocket protocol over a single TCP connection, and/or an Open Data Protocol (OData) interface.

One or more applications 125 executing on server 120 may communicate with DBMS 112 of database 110 using database management interfaces such as, but not limited to, Open Database Connectivity (ODBC) and Java Database Connectivity (JDBC) interfaces. These types of applications 125 may use Structured Query Language (SQL) to manage and query data stored in database 110.

DBMS 112 serves requests to retrieve and/or modify data of database tables 114, and also performs administrative and management functions. Such functions may include snapshot and backup management, indexing, optimization, garbage collection, archiving, data load-back, and/or any other database functions that are or become known. DBMS 112 may also provide application logic, such as database procedures and/or calculations, according to some embodiments. This application logic may comprise scripts, functional libraries and/or compiled program code.

Application server 120 may be separated from or closely integrated with database 110. A closely-integrated application server 120 may enable execution of server applications 125 completely on the database platform, without the need for an additional application server. For example, according to some embodiments, application server 120 provides a comprehensive set of embedded services which provide end-to-end support for Web-based applications. The services may include a lightweight web server, configurable support for OData, server-side JavaScript execution and access to SQL and SQLScript.

Database 110 may comprise any query-responsive data source or sources that are or become known, including but not limited to a structured-query language (SQL) relational database management system. Database tables 114 may comprise a relational database, a multi-dimensional database, an eXtendable Markup Language (XML) document, or any other data storage system storing structured and/or unstructured data. The data of database tables 114 may be distributed among several relational databases, dimensional databases, and/or other data sources. Embodiments are not limited to any number or types of data sources.

In some embodiments, the data of database tables 114 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 130 may comprise one or more devices executing program code of a software application for presenting user interfaces to allow interaction with application server 120. The user interfaces may comprise user interfaces suited for reporting, data analysis, data modelling, and/or any other functions based on the data of database 110.

Presentation of a user interface as described herein may comprise any degree or type of rendering, depending on the type of user interface code generated by application server 120. For example, a client 130 may execute a Web Browser to request and receive a Web page (e.g., in HTML format) from application server 120 via HTTP, HTTPS, and/or WebSocket, and may render and present the Web page according to known protocols. Embodiments are not limited to a Web browser, as one or more of clients 130 may also or alternatively present user interfaces by executing a stand-alone executable file (e.g., an .exe file) or code (e.g., a JAVA applet, Flash code) within a virtual machine.

Administration device 140 may provide management of database 110. For example, administration device 140 may define the structure of tables within database tables 114, may configure hosts within database 110, may schedule backup operations, may initiate archiving, and may instruct DBMS 112 to load archived data back into database tables 114.

As mentioned above and in the present Background, DBMS 112 may provide archiving of data stored in database tables 114. Archiving removes data from database tables 114 so the data can no longer be accessed therefrom, but may be retrieved from archive files at a later date, if necessary. According to some embodiments, archiving may be initiated in response to instructions received from administration device 140 and/or clients 130.

In some embodiments, DBMS 112 uses archiving objects to write data to archive files 116, which are stored in a filesystem which may or may not share storage space with database 110, and/or to remote storage 150. The archiving objects specify which data is to be archived and how it is to be archived, and may be stored among database tables 114. Customizations to archiving objects may also be stored as "customizing" objects in database 110. An archiving object may describe which database objects are to be handled together as a single object. Briefly, the archiving process may include writing data sequentially into newly-created archive files based on the structure described by the associated archiving object and any associated customizations, deleting the archived data from the database, and storing the newly-created archive file to a file storage system.

Figure 2:
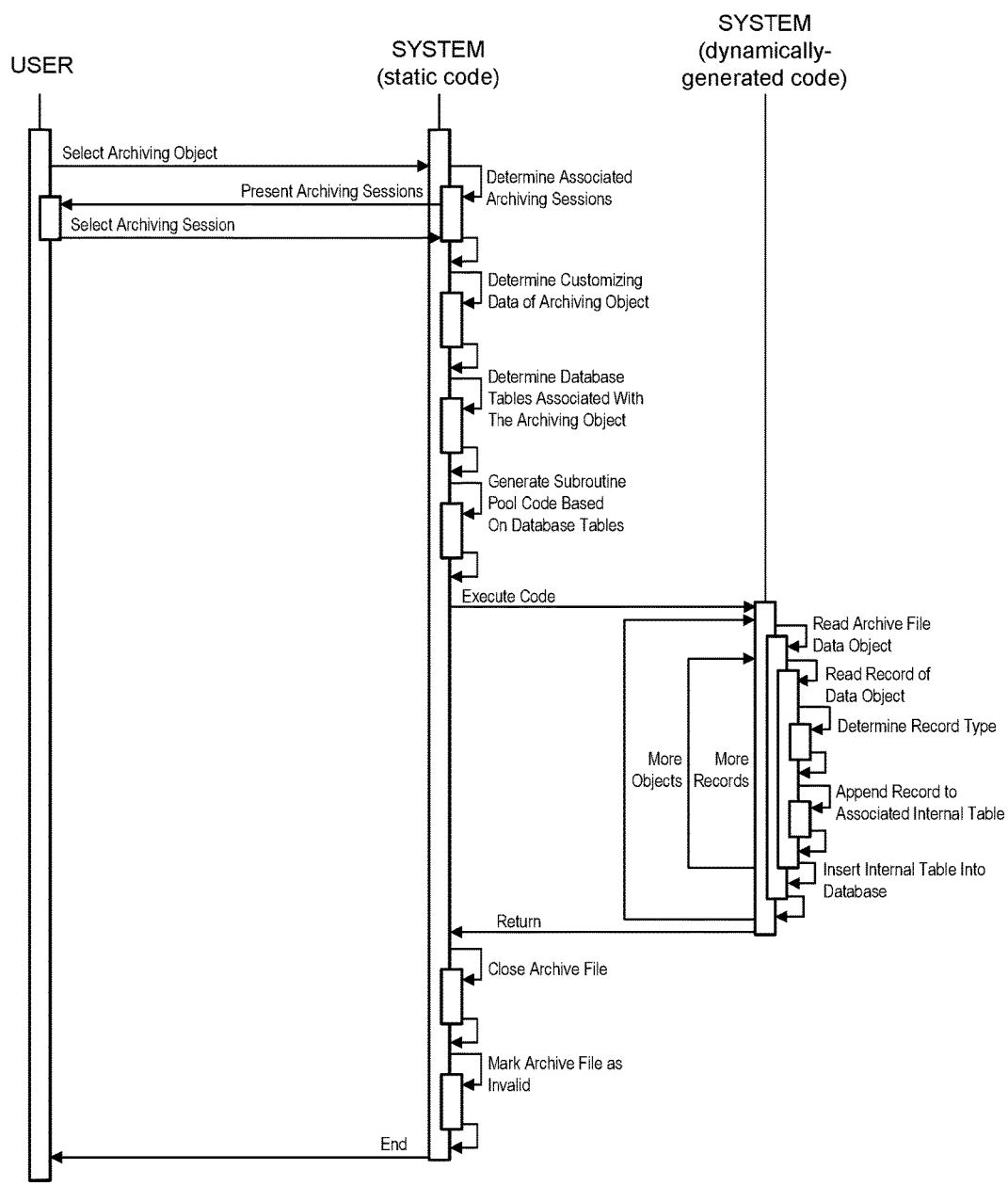
FIG. 2 is a sequence diagram of a process according to some embodiments.
Figure 9:
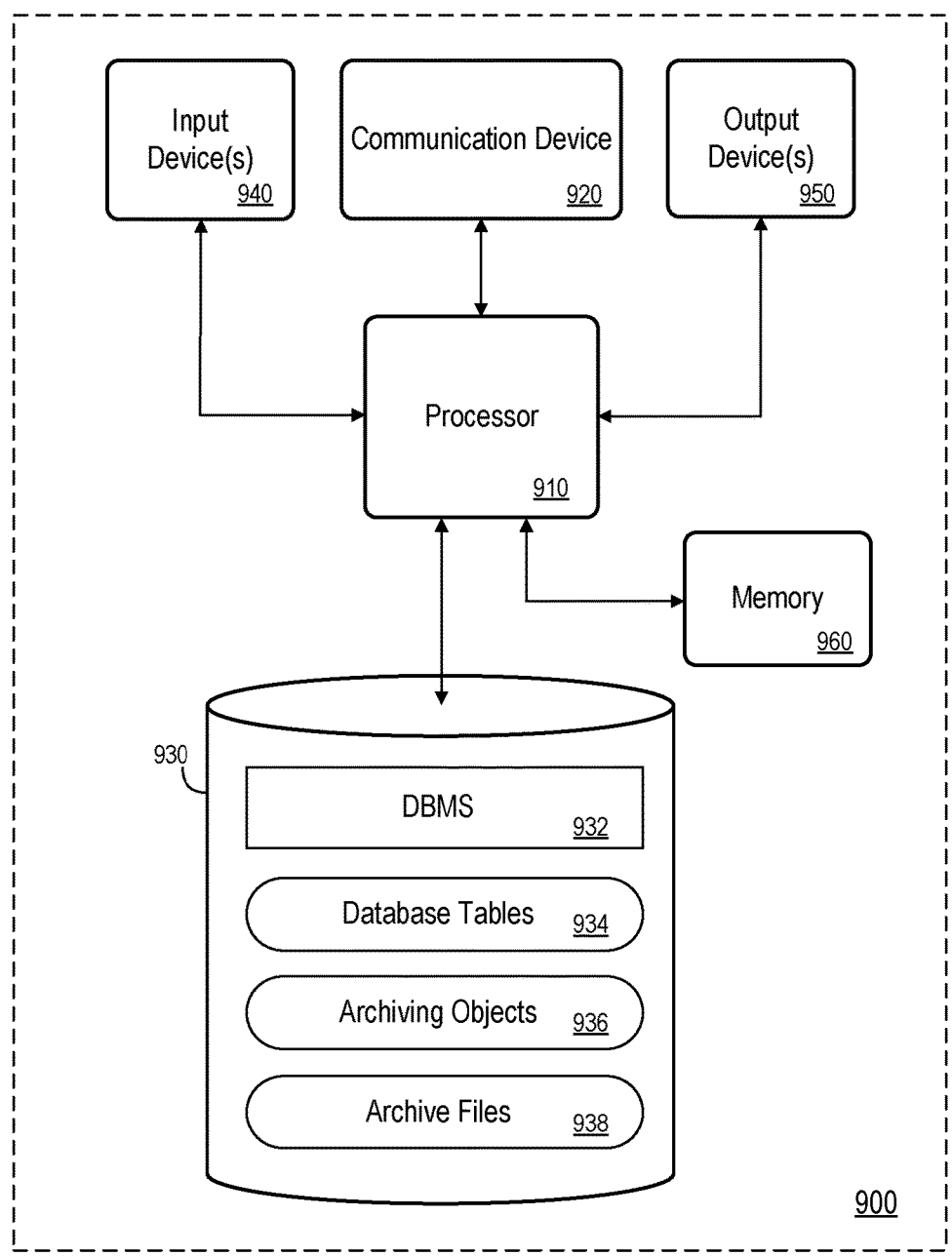
FIG. 9 is a block diagram of an apparatus according to some embodiments.

FIG. 2 comprises a sequence diagram according to some embodiments. The illustrated sequence may provide efficient load-back of archived data to a database. In some embodiments, various hardware elements of architecture 100 (e.g., one or more processors) execute program code to perform the functions described herein. All functions and processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a user establishes a communication channel with a system providing archiving. For example, a database administrator may operate administration device 140 to access database 110, either directly as shown in FIG. 1 or through application server 120. According to some embodiments, the user accesses a login interface provided by the system, e.g., by executing a Web browser on administration device 140 and entering a Uniform Resource Locator corresponding to a login page of a Web server associated with the system. The user logs in using the login page and manipulates further interfaces provided by the Web server to initiate load-back of archived data. In some embodiments, initiation of the load-back begins with the selection of an archiving object, as illustrated in FIG. 2.

FIG. 3 is an outward view of user interface 300 for selecting an archiving object according to some embodiments. User interface 300, to which embodiments are not limited, lists names of archiving objects and their corresponding descriptions. The user manipulates user interface 300 to select an archiving object which is associated with the archive files whose data is to be loaded back into the database.

In this regard, each archive file is associated with an archiving object and an archiving session which generated the archiving file. Accordingly, an archiving object may be associated with more than one archiving file, as well as with one or more archiving session. Therefore, in response to selection of the archiving object, the system determines the archiving sessions associated with the archiving object and presents the archiving sessions to the user.

For example, FIG. 4 is an outward view of user interface 400 presenting archiving sessions associated with the archiving object "BC_DBLOGS". The presented archiving sessions consist of archiving sessions during which an archive file was created based on the archiving object "BC_DBLOGS". The user may manipulate user interface 400 to select an archiving session. Since, as described above, an archive file is generated during a particular archiving session based on a particular archiving object, identification of an archiving object and an archiving session allows identification of a corresponding archive file.

Returning to FIG. 2, the system determines customizing data of the selected archiving object after the user selects the archiving session. According to some embodiments, the customizing data is stored in the definition of the archiving object. FIG. 5 shows tables defined by the customizing data of the archiving object BC_DBLOGS.

After determination of the customizing data, the system determines the database tables which are archived by the selected archiving object. The list of database tables may be stored in an associated standard table (e.g., V_ARC_DEF). FIG. 6 illustrates interface 600 displaying a list of tables which are associated with the archiving object BC_DBLOGS according to some embodiments. The list of tables which belong to a given archiving object is defined when the archiving object is created. An archiving object is created via known procedures described in the known transaction AOBJ.

FIG. 7 further illustrates interface 700 displaying a list of fields and their associated tables which are associated with an example archiving object according to some embodiments, the list being stored in the standard table V_ARC_DEF.

Based on the determined database tables, the system dynamically generates a subroutine pool which may be executed to create internal tables and populate the tables based on data stored in the subject archive file. According to one example, the code may be generated using the Advanced Business Application Programming (ABAP) syntax: GENERATE SUBROUTINE POOL itab NAME prog, where itab is an internal table filled with ABAP code statements required to define the internal tables (for example: "data: it_invoice_header type invoice_table") and counters for use as described below. prog includes the name of the INCLUDE statement, for example the name of the archiving object concatenated with "_SRP" (i.e., from subroutine pool).

Generally, the subroutine pool may be generated to perform the following steps:

1) Get an object including one or more records of data from the archive file (e.g., using the function module "ARCHIVE_GET_NEXT_OBJECT"; 2) Determine one record's type based on the "record_type" property of the record; 3) Append the record to the appropriate internal table based on its determined type, which contains the name of the appropriate internal table; 4) Increment a counter specific to the internal table to which the record was added; 5) return to step 2) to process additional records of the object, if any; 6) if the object includes no additional records, insert the content of each internal table having a counter value greater than zero back into the database and reset the counter; and 7) return to step 1) get a next object of the archive file, if any.

For purposes of the foregoing example, it will be assumed that it is has been determined that the selected archiving object is associated with a database table storing invoice data. Based on the details of this table, such as those illustrated in FIG. 7, it is determined that each invoice and all its content is referred to as an "object". Moreover, it is determined that each invoice consists of a header and one or more items, and each item is associated with one price, which may in turn be associated with a discount rate.

Based on this database table structure, the dynamically-generated code of the subroutine pool contains definitions of four tables, one for the invoice header content (e.g., it_invoice_table), one for the line items (e.g., it_invoice_content_table), one for the price line items (e.g., it_item_price_table), and one for the discount rates (e.g., it_discount_table). The subroutine pool to populate the four tables as described above may be as follows:

Get_next_record (out: type_record; out record_data)
Case type_record:
  When "invoice_table": append record_data to it_invoice_table.
  When "invoice_content_table": append record_data to it_invoice_content_table.
  When "item_price_table": append record_data to it_item_price_table.
  When "discount_table": append record_data to it_discount_table.

FIG. 8 illustrates contents of archive file 800 for the purpose of describing execution of the code according to some embodiments and as illustrated in FIG. 2. File 800 includes three objects. Invoice_1 includes two items. Invoice_2 includes one item, and invoice_3 includes four items and one discount rate for one of its four items.

Initially, data object "1" is read from archive file 800. The data object includes five records 801-805. Next, record 801 is read and its record type is determined to be "invoice_table". Record 801 is then appended to the internal table (i.e., "it_invoice_table") associated with the record type "invoice_table", and a counter associated with this internal table is incremented to one.

Since data object "1" includes additional records, record 802 is then read and its record type is determined to be "invoice_content_table". Record 802 is appended to the internal table (i.e., "it_invoice_content_table") which is associated with the record type "invoice_content_table", and a counter associated with the internal table is incremented to one. Similarly, record 803 is read, its record type is determined to be "item_price_table", record 803 is appended to the internal table (i.e., "it_item_price_table") which is associated with the record type "item_price_table", and a counter associated with it_item_price_table is incremented to one.

In the case of next record 804, its record type is determined to be "invoice_table" and it is therefore appended to it_invoice_table. The counter associated with it_invoice_table, which was previously incremented to one as a result of appending record 801, is incremented to two. Then, next record 805 is read and its record type is determined to be "item_price_table". It is therefore appended to it_item_price_table and the counter associated with it_item_price_table, which was previously incremented to one as a result of appending record 803, is incremented to two.

All records of data object "1" having been processed, the internal tables which are associated with counter values greater than zero are inserted into the database (e.g., database tables 114). Specifically, according to the present example, it_invoice_table it_invoice_content_table, and it_item_price_table are inserted into the database. No records were appended to it_discount_table, therefore its associated counter value equals zero and it is not inserted into the database. All counter values are then reset to zero, the internal tables are initialized to delete their data and a next data object is retrieved from the archive file.

Data object "2" includes three records 806-808, which are appended to respective three internal tables which are then inserted into the database as described above. Data object "3" is then retrieved, which includes ten records. Of these records, record 809 is appended to the table it_invoice_table, records 810, 812, 184 and 816 are appended to the table it_invoice_content_table, records 811, 813, 815 and 817 are appended to the table it_item_price_table, and record 818 is appended to the table it_discount_table. Each of these tables is then inserted into the database.

Archive file 800 includes no additional objects, so execution of the dynamically-generated code then returns. The archive file is closed and is marked as "invalid" (e.g., in the index of archive files). Marking the file as invalid prevents a later load-back of the data of the file, which may cause inconsistencies in the database if allowed to occur.

System 900 may comprise a general-purpose computing system and may execute program code to perform any of the processes described herein. System 900 may comprise an implementation of database system 110 according to some embodiments. System 900 may include other unshown elements according to some embodiments.

System 900 includes processor 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

DBMS 932 may comprise program code executed by processor 910 to cause apparatus 900 to perform any one or more of the processes described herein. Embodiments are not limited to execution of these processes by a single apparatus. Database tables 934 may include database tables 114 as described above. As also described above, database tables 114 may be stored in volatile memory such as memory 960. Data storage device 930 may also store data and other program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
 a memory storing processor-executable program code; and
 a processor to execute the processor-executable program code in order to cause the computing system to:
  receive an instruction to load data associated with an archiving object and an archiving session into a database system;
  determine an archive file associated with the archiving object and the archiving session;
  determine one or more database tables of the database system and fields of the one or more database tables associated with the archive file;
  automatically generate processor-executable code of a subroutine pool based on the fields of the one or more database tables; and
  execute the processor-executable code of the subroutine pool to:
   read one or more data objects of the archive file;
   populate one or more internal tables based on records of the one or more data objects; and
   insert the data of the one or more internal tables into corresponding ones of the one or more database tables of the database system.

2. A computing system according to claim 1, wherein automatic generation of the processor-executable code of the subroutine pool comprises:
 execution of the code statement GENERATE SUBROUTINE POOL itab NAME prog, where itab is an internal table of code statements to define the one or more internal tables based on the fields of the one or more database tables and prog is a name of an INCLUDE statement.

3. A computing system according to claim 1, wherein reception of the instruction comprises:
 reception from a user of a selection of the archiving object;
 determination of one or more archiving sessions associated with the archiving object;
 presentation of the one or more archiving sessions to the user; and
 reception from the user of a selection of the archiving session from the presented one or more archiving sessions.

4. A computing system according to claim 1, wherein execution of the processor-executable code of the subroutine pool comprises:
 reading of a first record of a first data object of the archive file;
 determination of a type of the first record;
 determination of one of the one or more internal tables associated with the type of the first record; and
 appending of the first record to the determined one of the internal tables.

5. A computing system according to claim 4, wherein appending of the first record to the determined one of the internal tables comprises:
 incrementing a counter associated with the determined one of the internal tables.

6. A computing system according to claim 4, wherein execution of the processor-executable code of the subroutine pool comprises:
 reading of a second record of the first data object of the archive file;
 determination of a type of the second record, the type of the second record different from the type of the first record;
 determination of a second one of the one or more internal tables associated with the type of the second record; and
 appending of the second record to the determined second one of the internal tables.

7. A computing system according to claim 6, wherein appending of the first record to the determined one of the internal tables comprises incrementing a counter associated with the determined one of the internal tables, wherein appending of the second record to the determined second one of the internal tables comprises incrementing a second counter associated with the determined second one of the internal tables, and where insertion of the one or more internal tables into corresponding ones of the one or more database tables of the database system comprises determining internal tables associated with a counter value greater than a threshold value.

8. A non-transitory computer-readable medium storing program code, the program code executable by a processor of a computing system to cause the computing system to:
receive an instruction to load data associated with an archiving object and an archiving session into a database system;
determine an archive file associated with the archiving object and the archiving session;
determine one or more database tables of the database system and fields of the one or more database tables associated with the archive file;
automatically generate processor-executable code of a subroutine pool based on the fields of the one or more database tables; and
execute the processor-executable code of the subroutine pool to:
read one or more data objects of the archive file;
determine a record type for each record of each of the one or more data objects;
based on the determined record types, populate one or more internal tables with the records of the one or more data objects; and
insert the data of the one or more internal tables into corresponding ones of the one or more database tables of the database system.

9. A medium according to claim 8, wherein automatic generation of the processor-executable code of the subroutine pool comprises:
execution of the code statement GENERATE SUBROUTINE POOL itab NAME prog, where itab is an internal table of code statements to define the one or more internal tables based on the fields of the one or more database tables and prog is a name of an INCLUDE statement.

10. A medium according to claim 8, wherein reception of the instruction comprises:
reception from a user of a selection of the archiving object;
determination of one or more archiving sessions associated with the archiving object;
presentation of the one or more archiving sessions to the user; and
reception from the user of a selection of the archiving session from the presented one or more archiving sessions.

11. A medium according to claim 8, wherein execution of the processor-executable code of the subroutine pool comprises:
reading of a first record of a first data object of the archive file;
determination of a type of the first record;
determination of one of the one or more internal tables associated with the type of the first record; and
appending of the first record to the determined one of the internal tables.

12. A medium according to claim 11, wherein appending of the first record to the determined one of the internal tables comprises:
incrementing a counter associated with the determined one of the internal tables.

13. A medium according to claim 11, wherein execution of the processor-executable code of the subroutine pool comprises:
reading of a second record of the first data object of the archive file;
determination of a type of the second record, the type of the second record different from the type of the first record;
determination of a second one of the one or more internal tables associated with the type of the second record; and
appending of the second record to the determined second one of the internal tables.

14. A medium according to claim 13, wherein appending of the first record to the determined one of the internal tables comprises incrementing a counter associated with the determined one of the internal tables,
wherein appending of the second record to the determined second one of the internal tables comprises incrementing a second counter associated with the determined second one of the internal tables, and
where insertion of the one or more internal tables into corresponding ones of the one or more database tables of the database system comprises determining internal tables associated with a counter value greater than a threshold value.

15. A computer-implemented method comprising:
receiving an instruction to load data associated with an archiving object and an archiving session into a database system;
determining an archive file associated with the archiving object and the archiving session;
determining one or more database tables of the database system and fields of the one or more database tables associated with the archive file;
automatically generating processor-executable code of a subroutine pool based on the fields of the one or more database tables; and
executing the processor-executable code of the subroutine pool to:
read one or more data objects of the archive file;
populate one or more internal tables based on records of the one or more data objects; and
insert the data of the one or more internal tables into corresponding ones of the one or more database tables of the database system.

16. A computer-implemented method according to claim 15, wherein automatically generating the processor-executable code of the subroutine pool comprises:
executing the code statement GENERATE SUBROUTINE POOL itab NAME prog, where itab is an internal table of code statements to define the one or more internal tables based on the fields of the one or more database tables and prog is a name of an INCLUDE statement.

17. A computer-implemented method according to claim 15, wherein receiving the instruction comprises:
receiving a selection of the archiving object from a user;
determining one or more archiving sessions associated with the archiving object;
presenting the one or more archiving sessions to the user; and
receiving a selection of the archiving session from the presented one or more archiving sessions from the user.

18. A computer-implemented method according to claim 15, wherein executing the processor-executable code of the subroutine pool comprises:
  reading a first record of a first data object of the archive file;
  determining a type of the first record;
  determining one of the one or more internal tables associated with the type of the first record; and
  appending the first record to the determined one of the internal tables.

19. A computer-implemented method according to claim 18, wherein executing the processor-executable code of the subroutine pool comprises:
  reading a second record of the first data object of the archive file;
  determining a type of the second record, the type of the second record different from the type of the first record;
  determining a second one of the one or more internal tables associated with the type of the second record; and
  appending the second record to the determined second one of the internal tables.

20. A computer-implemented method according to claim 19, wherein appending the first record to the determined one of the internal tables comprises incrementing a counter associated with the determined one of the internal tables,
  wherein appending the second record to the determined second one of the internal tables comprises incrementing a second counter associated with the determined second one of the internal tables, and
  where inserting the one or more internal tables into corresponding ones of the one or more database tables of the database system comprises determining internal tables associated with a counter value greater than a threshold value.

* * * * *